(12) United States Patent
Suzuki et al.

(10) Patent No.: US 8,373,647 B2
(45) Date of Patent: Feb. 12, 2013

(54) SURFACE LIGHT SOURCE DEVICE AND DISPLAY DEVICE

(75) Inventors: Takafumi Suzuki, Aichi (JP); Ying Bao Yang, Kanagawa (JP)

(73) Assignee: Sony Corporation (JP)

( * ) Notice: Subject to any disclaimer, the term of this patent is extended or adjusted under 35 U.S.C. 154(b) by 379 days.

(21) Appl. No.: 12/657,774

(22) Filed: Jan. 27, 2010

(65) Prior Publication Data
US 2010/0207933 A1 Aug. 19, 2010

(30) Foreign Application Priority Data

Feb. 2, 2009 (JP) ................. P2009-021196

(51) Int. Cl.
*G09G 3/36* (2006.01)
*F21V 7/04* (2006.01)
(52) U.S. Cl. ...................... 345/102; 362/613
(58) Field of Classification Search ............ 345/87, 345/102, 204; 362/551, 559, 613–617
See application file for complete search history.

(56) References Cited

U.S. PATENT DOCUMENTS

| | | | |
|---|---|---|---|
| 8,089,582 B2 * | 1/2012 | Sekiguchi et al. | 349/65 |
| 2005/0270796 A1 * | 12/2005 | Ichikawa et al. | 362/559 |
| 2006/0245211 A1 * | 11/2006 | Takada | 362/615 |
| 2008/0019149 A1 * | 1/2008 | Chang et al. | 362/616 |
| 2009/0167990 A1 * | 7/2009 | Konno et al. | 349/65 |

FOREIGN PATENT DOCUMENTS

| | | |
|---|---|---|
| JP | 2001-021863 A | 1/2001 |
| JP | 2005347214 A | 12/2005 |
| JP | 2007-122971 A | 5/2007 |

OTHER PUBLICATIONS

Office Action from Japanese Application No. 2009-021196, dated Oct. 27, 2010.

* cited by examiner

*Primary Examiner* — Hong Zhou
(74) *Attorney, Agent, or Firm* — Lerner, David, Littenberg, Krumholz & Mentlik, LLP

(57) ABSTRACT

A surface light source device, which may perform surface light emission using a plurality of light guide members while suppressing formation of emission lines, and a display device using the surface light source device is provided. The surface light source device includes light sources, and a plurality of light guide members, each light guide member having a light incidence surface for light entering from each of the light sources, and making surface light emission based on incident light from the light incidence surface. The plurality of light guide members are arranged on the same plane, and each light guide member has tapered or curved surfaces adjacent to the light incidence surface, each tapered or curved surface having a predetermined angle against the light incidence surface.

7 Claims, 17 Drawing Sheets

RELATED ART

COMPARATIVE EXAMPLE

EXAMPLE 2

SURFACE LIGHT SOURCE DEVICE AND DISPLAY DEVICE

CROSS-REFERENCE TO RELATED APPLICATION

The present application claims priority from Japanese Patent Application No. JP 2009-021196 filed in the Japanese Patent Office on Feb. 2, 2009, the entire content of which is incorporated herein by reference.

BACKGROUND OF THE INVENTION

1. Field of the Invention

The present invention relates to a surface light source device using a light guide plate, and a display device having the surface light source device.

2. Description of Related Art

A liquid crystal display (LCD), which is used for various electronic devices such as a television, a mobile phone, a notebook PC (Personal Computer), and digital camera, generally includes a liquid crystal panel and a backlight irradiating the liquid crystal panel. A light source such as light emitting diode (LED) or cold cathode fluorescent lamp (CCFL) is used for the backlight, and power consumption of the backlight accounts for a large fraction of total power consumed by the display.

A method is proposed as a measure to reduce power consumption of the backlight, where the backlight is divided into several areas, and each area is independently controlled to be turned on or off, so that a selected region is illuminated in accordance with a display region of an image (see Japanese Unexamined Patent Application Publication No. 2001-21863).

A so-called partial drive control method is recently noted, where a backlight is fractioned, and driven in such a manner that an on light-source region and an off light-source region are successively changed in accordance with an image to be displayed. Use of the method may reduce power consumption, and besides, improve contrast, leading to higher image quality. Furthermore, attempt of improving visibility of moving picture display is recently made by using false impulse drive in the partial driving method of the backlight.

A technique is proposed for a backlight structure for achieving such partial drive control, where a plurality of light guide plates are laid, and light sources, which may be independently controlled to be turned on, are arranged for each light guide plate.

SUMMARY OF THE INVENTION

However, when the plurality of light guide plates are arranged, the following difficulty occurs: light leakage occurs in a region near a boundary between the light guide plates, leading to formation of emission lines or hot spots. When such emission lines are formed, appearance of a displayed image becomes unnatural. A technique is proposed to prevent such light leakage in the region near the boundary, where a light reflection layer or a light shielding layer is provided in the boundary portion (see Japanese Unexamined Patent Application Publication No. 2007-122971). However, use of the technique causes increase in number of steps for forming the layer, and besides, the light shielding layer reduces use efficiency of light. Therefore, it is desired to achieve a backlight structure that may suppress formation of emission lines due to light leakage without using such a light reflection layer or a light shielding layer.

It is desirable to provide a surface light source device that may perform surface light emission using a plurality of light guide members while suppressing formation of emission lines, and a display device using the surface light source device.

According to an embodiment of the invention, there is provided a surface light source device including light sources, and a plurality of light guide members, each light guide member having a light incidence surface for light entering from each of the light sources, and making surface light emission based on incident light from the light incidence surface. The light guide members are arranged on the same plane, and each light guide member has tapered or curved surfaces adjacent to the light incidence surface, each tapered or curved surface having a predetermined angle against the light incidence surface.

A display device according to an embodiment of the invention includes the surface light source device according to the embodiment of the invention, and a display panel performing image display using light from the surface light source device.

In the surface light source device and the display device of the embodiment of the invention, a plurality of light guide members are arranged on the same plane, and predetermined tapered or curved surfaces are adjacent to a light incidence surface of each light guide member. Light entering each light guide member is repeatedly reflected within the light guide member and thus transmitted, and extracted from a certain surface (light emitting surface) during such a transmission process, contributing to surface light emission. Light from a light source is injected into the light guide member from the light incidence surface at a certain radiation angle. Therefore, particularly, when the radiation angle is large, an incidence angle of the light to a surface adjacent to the light incidence surface of the light guide member becomes smaller than a critical angle, leading to light leakage to the outside. This causes formation of emission lines in a region near a boundary between light guide plates in the case that a plurality of light guide members are arranged to perform surface light emission. On the other hand, as in the embodiment of the invention, since the surface adjacent to the light incidence surface is a tapered or curved surface, light entering a light guide member enters the tapered or curved surface at an angle equal to or larger than a critical angle regardless of a radiation angle of the light, so that the light tends to be reflected within the light guide plate. Accordingly, occurrence of light leakage as above is suppressed.

According to the surface light source device of the embodiment of the invention, a plurality of light guide members, each member having a light incidence surface for light entering from a light source, are arranged on the same plane, and tapered or curved surfaces are provided adjacently to a light incidence surface of each light guide member. Thus, surface light emission may be performed using the light guide members while suppressing formation of emission lines. In addition, according to the display device of the embodiment of the invention, image display with natural appearance may be performed.

Other and further objects, features and advantages of the invention will appear more fully from the following description.

DETAILED DESCRIPTION OF THE PREFERRED EMBODIMENTS

Hereinafter, a preferred embodiment of the invention will be described in detail with reference to drawings. The description is made in the following sequence.

1. Embodiment: an example of a surface light source device having tapered surfaces adjacently to a light incidence surface of each light guide plate in a configuration of a surface light source device using two light guide plates.
2. Modification 1: an example of a surface light source device using six light guide plates.
3. Modification 2: an example of a surface light source device having R surfaces adjacently to the light incidence surface.
4. Modification 3: an example of a surface light source device having light sources on each light incidence surface and on each tapered surface.
5. Modification 4: an example of a surface light source device having four tapered surfaces being surfaces vertically and horizontally adjacent to the light incidence surface.
6. Application example: an example of a display device using the surface light source device as a backlight.

Configuration of Surface Light Source Device 1

Figure 1A:
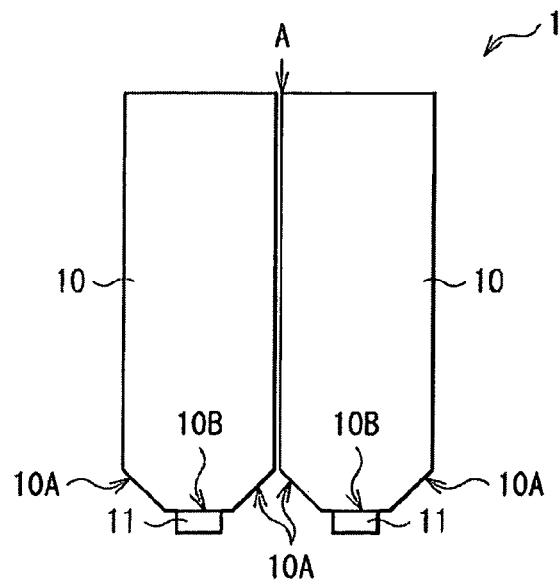
FIGS. 1A to 1C are views illustrating a schematic configuration of a surface light source device according to an embodiment of the invention.
Figure 1B:
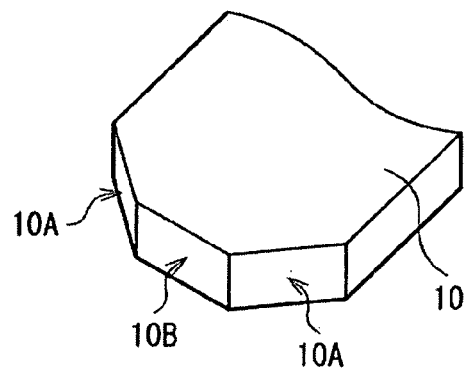
Figure 1C:
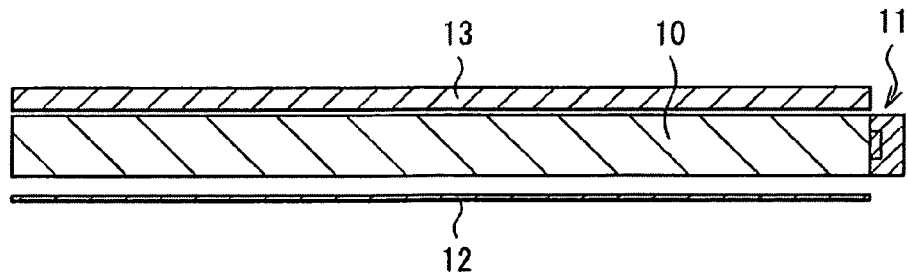

FIGS. 1A to 1C illustrate a schematic configuration of a surface light source device (surface light source device 1) according to an embodiment of the invention. FIG. 1A is a view of light guide plates of the surface light source device 1 as viewed from a top (light emitting surface) side, FIG. 1B is a perspective view of a region near a light incidence surface of a light guide plate, and FIG. 1C is a view illustrating a sectional configuration of the surface light source device 1. The surface light source device 1 is used for a backlight of a display device such as liquid crystal display, and particularly preferably used for a partial driving method using a plurality of light guide plates. In the surface light source device 1, several (here, two) light guide plates 10 (light guide members) are arranged on the same plane, and LED 11 as a light source is provided for each light guide plate 10. In such a configuration, a light emitting area of the surface light source device 1 is divided in two in the embodiment.

The light guide plate 10 is a plate-like optical member for transmitting light to be guided to a light emitting surface. The light guide plate 10 includes, for example, a transparent material such as glass or plastic, and specifically includes polycarbonate (refractive index: 1.59) or acryl (refractive index: 1.49). An overall planar shape of the light guide plate 10 is a rectangular shape, and a side face on one short side of the rectangular shape is formed to be a light incidence surface 10B. The LED 11 is provided on the light incidence surface 10B, and light emitted from the LED 11 is injected into the light guide plate 10 through the light incidence surface 10B. A prism or the like (not illustrated) for expanding a radiation angle of incident light may be provided on the light incidence surface 10B.

The LED 11 is disposed on each light incidence surface 10B of the light guide plate 10, and independently driven to be turned on or off by a not-illustrated light source drive section. While the LED 11 is provided one on each light incidence surface 10B here, at least two LEDs may be provided thereon. The number or an arrangement interval of the LED 11 may be appropriately set depending on necessary quantity of light, size of the light guide plate 10 or the like.

On the other hand, a bottom of the light guide plate is subjected to processing for extracting light, for example, grooving or dot printing (not illustrated each), which breaks a total reflection condition of light transmitted through the inside of the light guide plate 10, so that light is extracted from a top of the light guide plate 10. A reflection film 12 is provided below the light guide plate 10 as illustrated in FIG. 1C, and the reflection film 12 reflects return light to a lower side of the light guide plate 10, and returns the return light to a light emitting side, leading to improvement in use efficiency of light.

An optical film layer 13 is provided on a top (light emitting side) of the light guide plate 10. The optical film layer 13 includes a plurality of stacked optical films, and the optical films include a diffusion plate, a diffusion film, a lens film, a reflection polarizing film and the like. Such an optical film layer 13 adjusts in-plane luminance distribution or a radiation angle of light emitted from each light guide plate 10, so that illumination light being backlight is produced.

In the embodiment, two such light guide plates 10 are arranged with a gap A in such a manner that respective, rectangular long sides of the light guide plates 10 are opposed to each other. The gap A is filled with air (refractive index: 1) or a material having a low refractive index. The low-refractive index material includes, for example, fluorocarbon resin having a refractive index of 1.3 to 1.4 both inclusive. The low-refractive index material is filled in the gap A, thereby the device is physically strengthened, and displacement between the light guide plates 10 may be prevented. Width of the gap A is, for example, 0.01 mm to 0.2 mm both inclusive.

Figure 2:
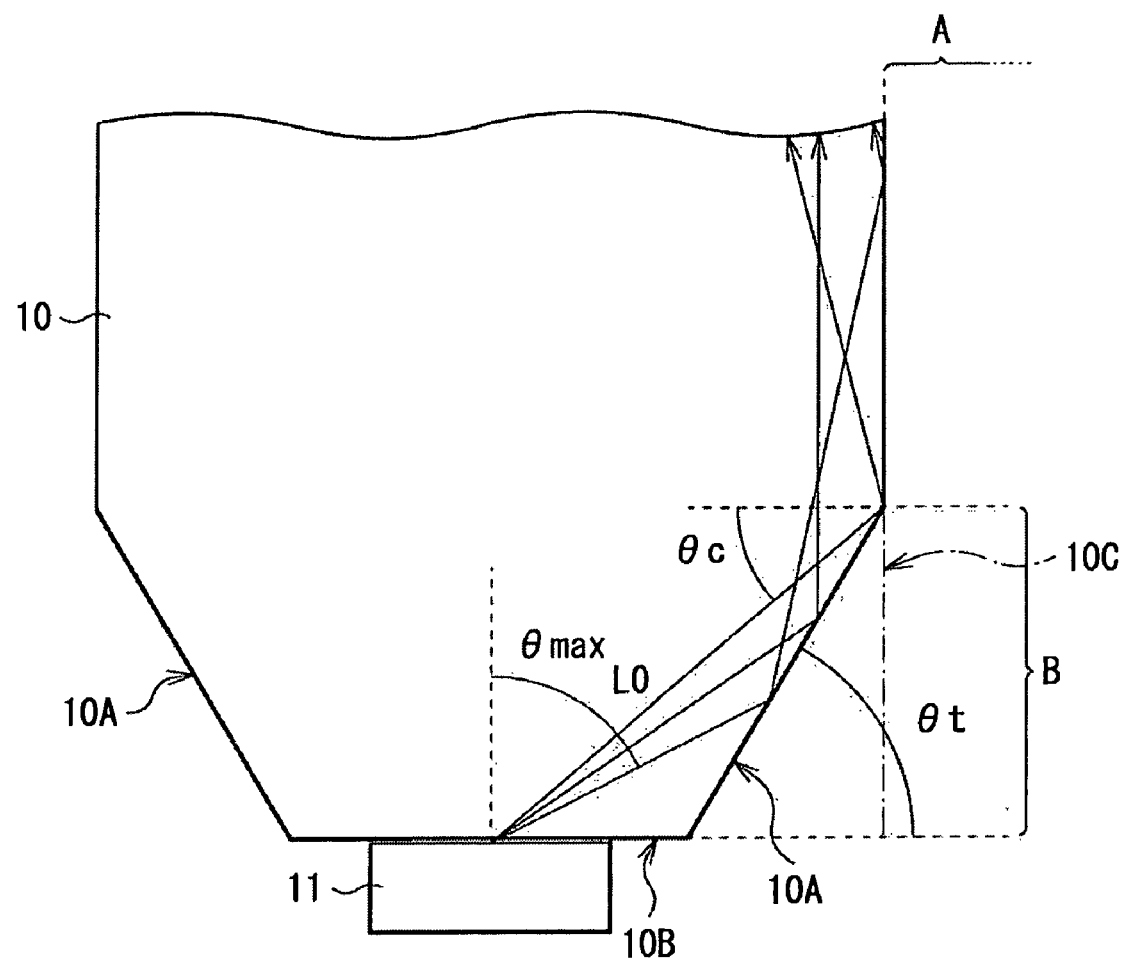
FIG. 2 is an enlarged view of a region near a light incidence surface of a light guide plate illustrated in FIGS. 1A to 1C.

As illustrated in FIGS. 1A and 1B, the light guide plate 10 has tapered surfaces 10A adjacently to the light incidence surface 10B, namely, on both sides of the light incidence surface 10B. In other words, a planar shape of the light guide plate 10 is formed in such a manner that two corners on a light incidence side of four rectangular corners have a tapered shape each. Hereinafter, a specific configuration of the tapered surface 10A is described with reference to FIG. 2. FIG. 2 is an enlarged view of a region near the light incidence surface 10B of the light guide plate 10.

As illustrated in FIG. 2, the tapered surface 10A is provided in a region B near the light incidence surface 10B adjacently to the light incidence surface 10B in the light guide plate 10. An angle (hereinafter, called taper angle) $\theta t$ of the tapered surface 10A against the light incidence surface 10B is given by the following conditional expression (1). In the expression, a maximum value of a radiation angle (half-value angle) of light (L0) emitted from the LED 11 is assumed to be $\theta max$, and when light enters the gap A from the light guide plate 10, a critical angle is assumed to be $\theta c$. For example, when polycarbonate (refractive index: 1.59) is used for the light guide plate 10, and the gap A is an air layer (in this case, the critical angle $\theta c$ is 39°), and light is injected from the light incidence surface 10B at a radiation angle $\theta max$ of 60°, the taper angle $\theta t$ may be 81° or less. The taper angle $\theta t$ is set in this way, thereby an incidence angle of light L0 is equal to or larger than the critical angle $\theta c$.

$\theta t \leq 90 - \{\theta c - (90 - \theta max)\}$

That is, $\theta t \leq 180 - (\theta max + \theta c)$ (1)

Operation and Effects of Surface Light Source Device 1

In the embodiment, when the LED 11 is driven to be turned on by a not-illustrated light source drive section, light is injected from the LED 11 into the light guide plate 10 through the light incidence surface 10B of the light guide plate 10. Light injected into the light guide plate 10 is repeatedly reflected within the light guide plate 10 and thus transmitted, and extracted from the top of the light guide plate 10 during such a transmission process. Thus, the surface light source device 1 performs surface light emission. The LED 11 on the two light guide plates 10 are independently controlled to be driven, so that the surface light source device 1 is controllably driven to be turned on or off for each of light emitting areas corresponding to the two light guide plates 10 (partial drive control).

Figure 3A:
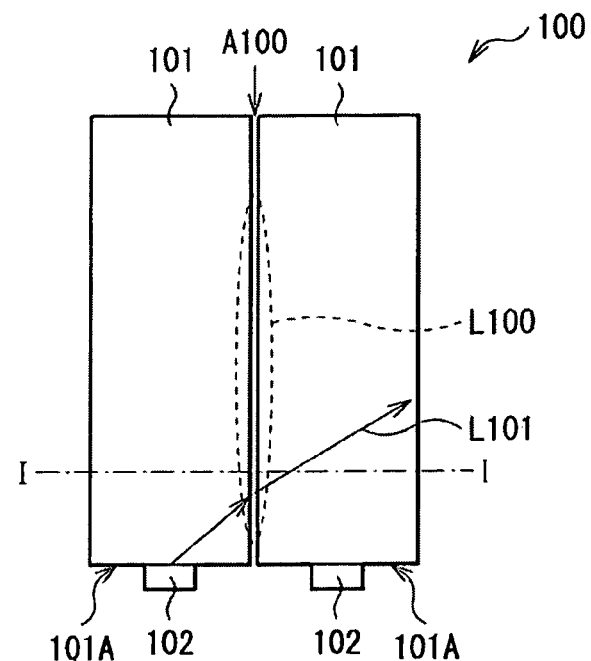
FIGS. 3A and 3B are views illustrating a schematic configuration of a surface light source device according to comparative example 1.
Figure 3B:
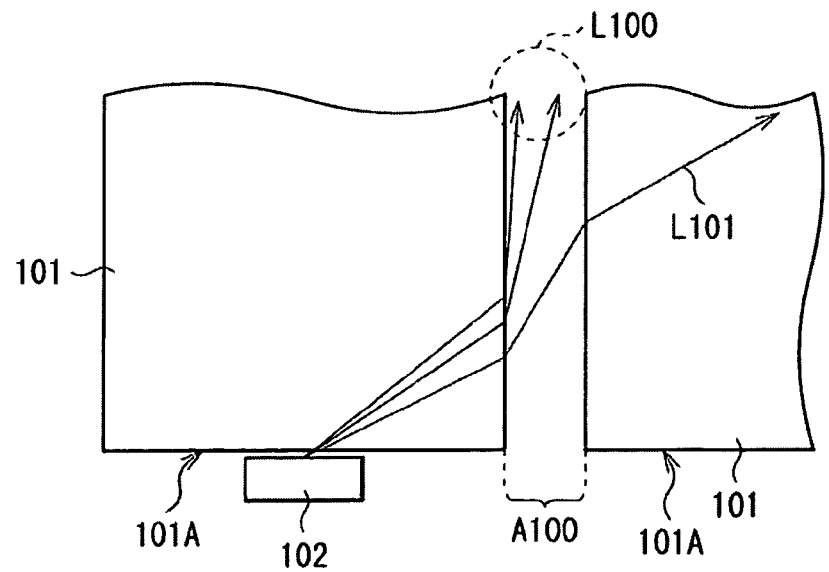
Figure 4A:
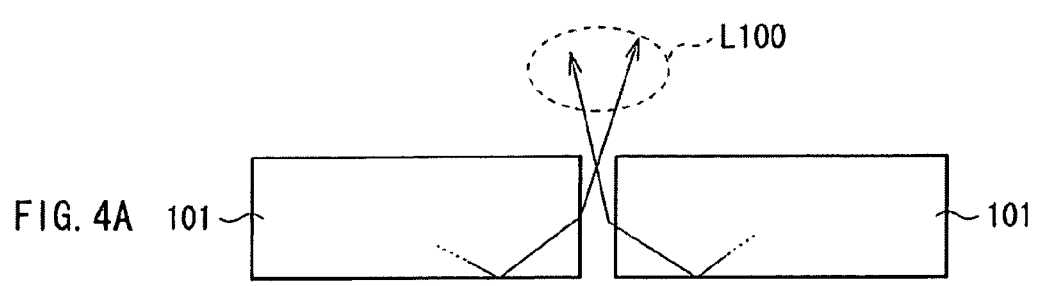
FIGS. 4A and 4B are views for illustrating occurrence of light leakage in the surface light source device illustrated in FIGS. 3A and 3B.
Figure 4B:
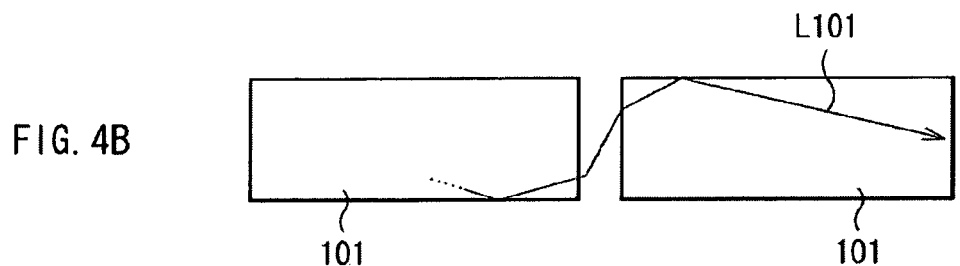
Figure 5:
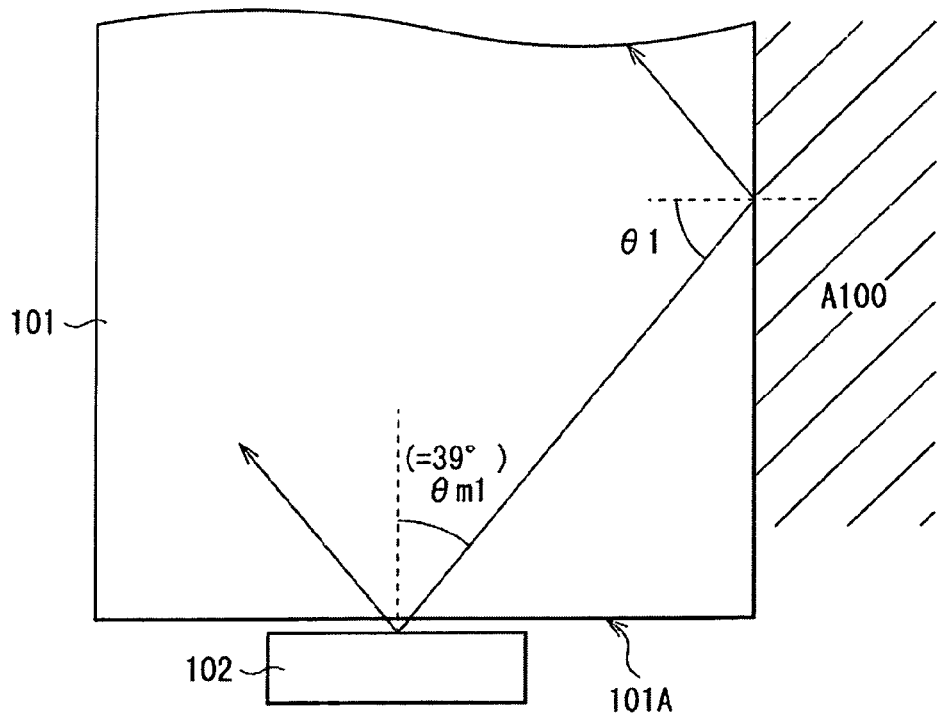
FIG. 5 is a view for illustrating a relationship between a radiation angle of light entering from LED and a critical angle.
Figure 6:
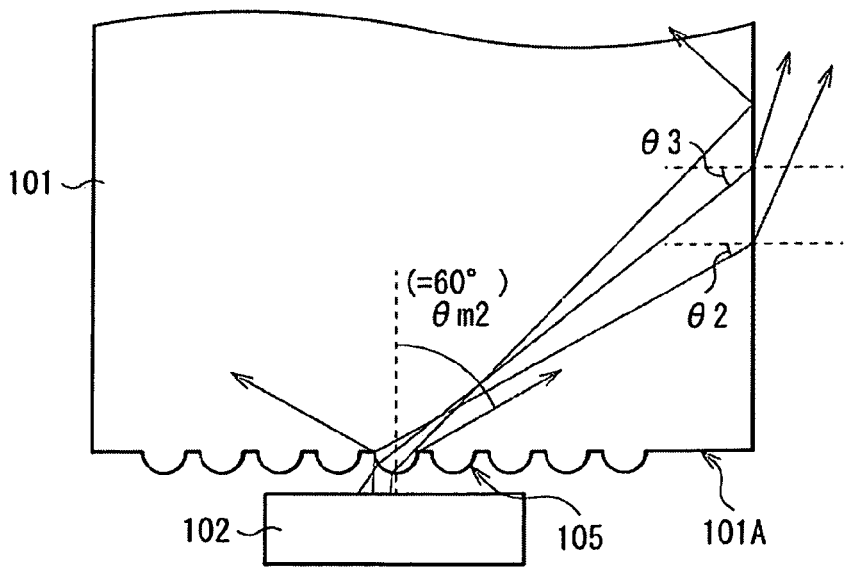
FIG. 6 is another view for illustrating a relationship between a radiation angle of light entering from LED and a critical angle.

Here, as comparative examples of the embodiment, first, a surface light source device (surface light source device 100) according to comparative example 1 will be described with reference to FIGS. 3A and 3B to FIG. 6. FIG. 3A is a view of the surface light source device 100 as viewed from a top, and FIG. 3B is an enlarged view of a region near a boundary between light guide plates of the surface light source device 100. FIGS. 4A and 4B are section views along a line I-I of FIG. 3A for illustrating occurrence of light leakage in the surface light source device 100. FIGS. 5 and 6 are views for illustrating influence of a radiation angle of light entering the light guide plate on light leakage.

In the surface light source device 100, two light guide plates 101 are arranged with a gap A100 in between on the same plane, and LED 102 is provided on each of light incidence surfaces 101A of the light guide plates 101. The surface light source device 100 has the same configuration as that of the surface light source device 1 of the embodiment except that tapered surfaces are not provided adjacently to the light incidence surface 101A of the light guide plates 101.

In such a surface light source device 100, as illustrated in FIG. 3B, since light from the LED 102 is injected into the light guide plates 101 from the light incidence surface 101A at a constant radiation angle, an incidence angle tends to be smaller than a critical angle at a boundary with the gap A100. Therefore, light entering the gap A100 at an incidence angle smaller than the critical angle is emitted to the outside of the light guide plate 101, leading to light leakage. Such leakage light is emitted to the upside of the gap A100, for example, as illustrated in FIG. 4A, causing occurrence of emission lines L100. Alternatively, as illustrated in FIG. 4B, the light passes through the gap A100, and enters an adjacent light guide plate 101 (L101), consequently an on region is hard to be clearly distinguished from an off region in a surface light source device subjected to partial drive control for each light guide plate.

The light leakage is affected by a radiation angle of light entering from the light incidence surface of the light guide plate 101. For example, in the case that polycarbonate is used for the light guide plate 101, and the gap A100 is an air layer (the critical angle $\theta c$ is 39°), when a maximum value of the radiation angle is assumed to be $\theta m1$ (=39°) as illustrated in FIG. 5, an incidence angle $\theta 1$ of light entering a boundary with the gap A100 is 51° to 90° both inclusive. That is, the incidence angle $\theta 1$ is equal to or larger than the critical angle $\theta c$, and therefore light leakage does not occur.

On the other hand, under the same condition, when a prism 105 is provided on the light incidence surface 101A so that the maximum value of the radiation angle is increased to $\theta m2$ (=60°) as illustrated in FIG. 6, an incidence angle of light entering the boundary with the gap A100 is 30° to 90° both inclusive. That is, incidence angles ($\theta 2$ and $\theta 3$) smaller than the critical angle $\theta c$ exist, leading to occurrence of light leakage. Such light leakage tends to occur in a region near the light incidence surface 101A.

However, a radiation angle is desirably expanded by, for example, providing the prism 105 on the light incidence surface 101A in order to obtain uniform emission luminance distribution from the light guide plate 101. Therefore, occurrence of light leakage is desired to be suppressed regardless of magnitude of the radiation angle.

Figure 7A:
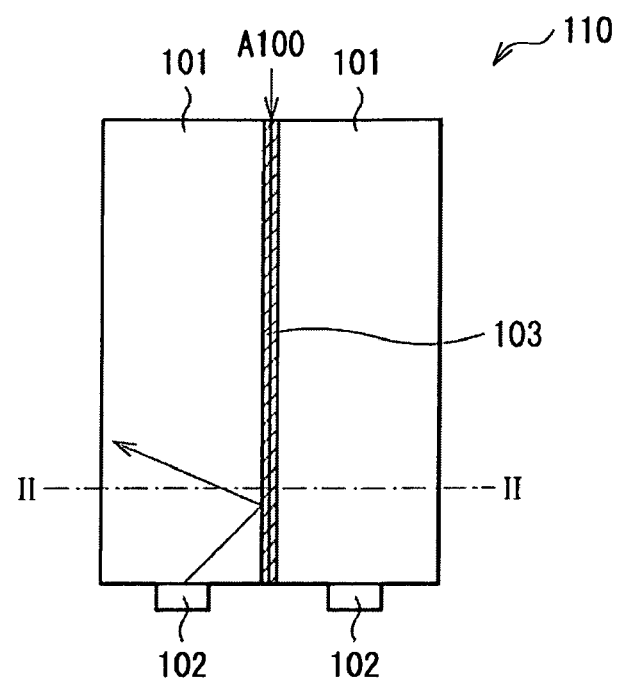
FIGS. 7A and 7B are views illustrating a schematic configuration of a surface light source device according to comparative example 2.
Figure 7B:
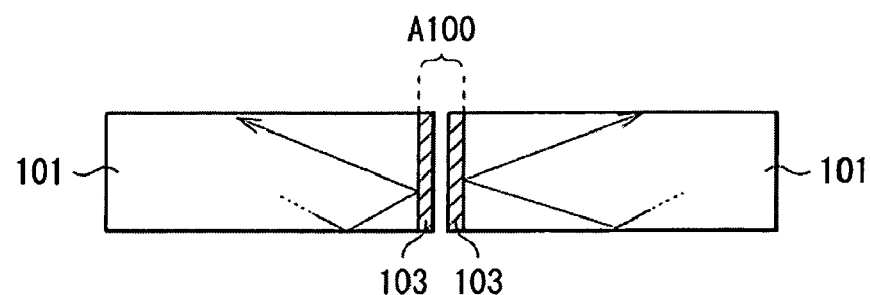
Figure 8A:
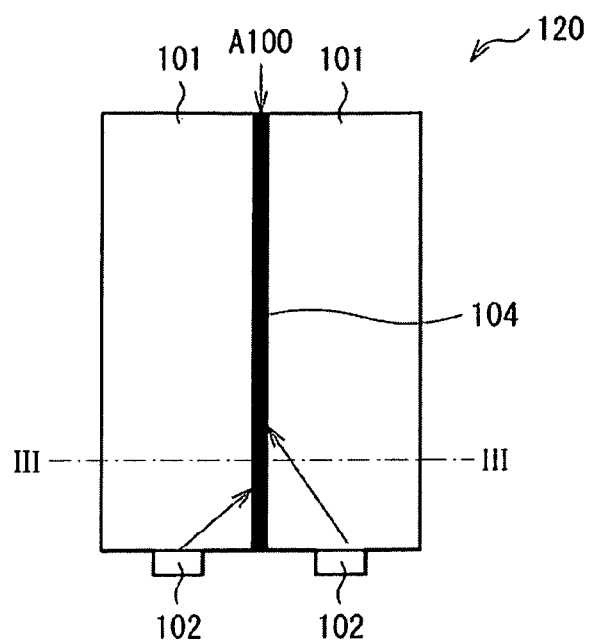
FIGS. 8A and 8B are views illustrating a schematic configuration of a surface light source device according to comparative example 3.
Figure 8B:
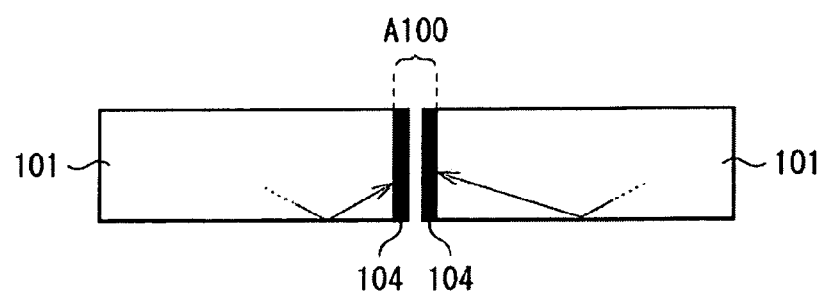

A technique of providing a light reflection member 103 in the gap A100 between the light guide plates 101 as illustrated in FIGS. 7A and 7B, or a technique of providing a light shielding member 104 in the gap A100 as illustrated in FIGS. 8A and 8B may be conceivable. FIG. 7A is a top view of a surface light source device 110 according to comparative example 2, and FIG. 7B is a section view along a line II-II of FIG. 7A. FIG. 8A is a top view of a surface light source device 120 according to comparative example 3, and FIG. 8B is a section view along a line II-II of FIG. 8A.

In the surface light source device 110 according to the comparative example 2, since the light reflection member 103 is provided in the gap A100, even if light enters the gap A100 at an angle smaller than the critical angle, such light is reflected by the light reflection member 103, and returned into the light guide plate 101. In the surface light source device 120 according to the comparative example 3, since the light shielding member 104 is provided in the gap A100, even if light enters the gap A100 at an angle smaller than the critical angle, such light is shielded (absorbed) by the light shielding member 104. In this way, according to the technique of the comparative example 2 and 3, occurrence of light leakage may be suppressed. However, since the light reflection member 103 or the light shielding member 104 needs to be formed in the gap A100, the number of process steps is increased. In addition, use efficiency of light is decreased in the comparative example 3 using the light shielding member 104.

On the other hand, in the embodiment, occurrence of light leakage may be suppressed without using the light reflection member or the light shielding member. Specifically, the predetermined tapered surfaces 10A are provided adjacently to the light incidence surface 10B of the light guide plate 10, thereby light entering the light guide plate 10 enters the tapered surface 10A and reflected by the surface at an angle equal to or larger than the critical angle regardless of a radiation angle of the light. Accordingly, occurrence of light leakage as above is suppressed.

As hereinbefore, in the embodiment, for example, two light guide plates 10 are arranged on the same plane, and each light guide plate 10 has the predetermined tapered surfaces 10A adjacent to the light incidence surface 10B for light entering from the LED 11. This enables surface light emission using the partial driving method using the two light guide plates 10 while suppressing occurrence of emission lines.

EXAMPLE 1

Figure 9:
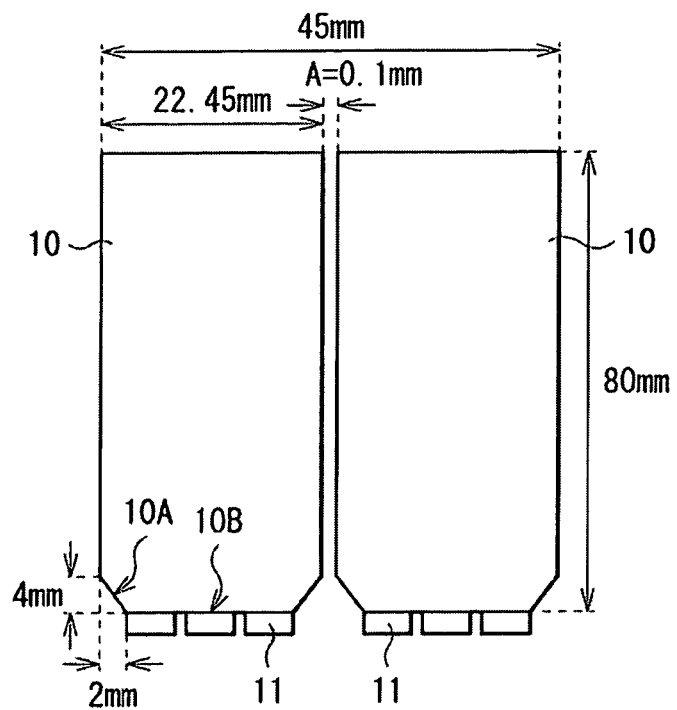
FIG. 9 is a view for illustrating a configuration of a surface light source device used in example 1.
Figure 11A:
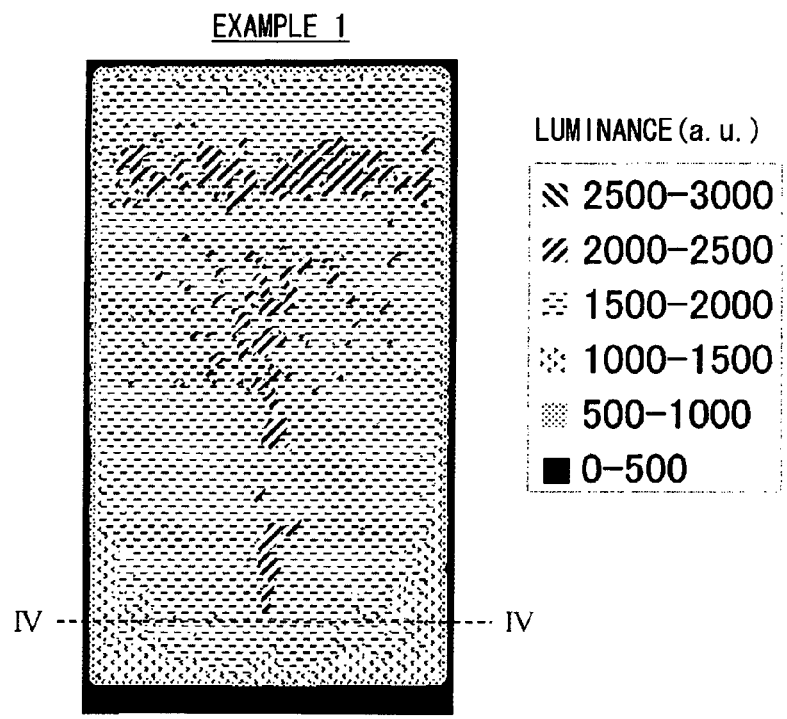
FIGS. 11A and 11B are diagrams illustrating a simulation result (luminance distribution) of the example 1.
Figure 11B:
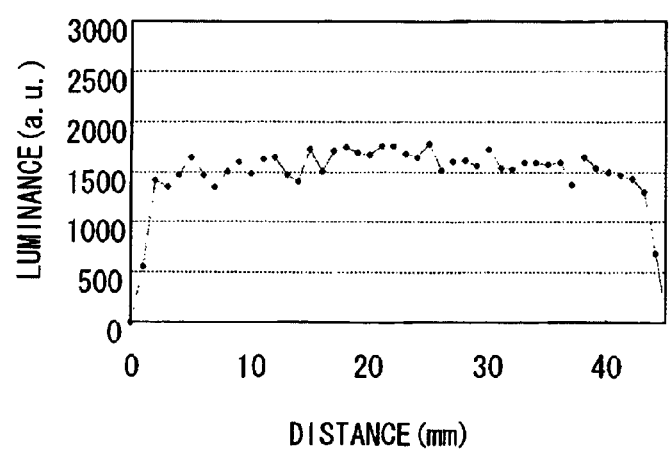

Simulation of luminance distribution measurement was performed as an example (example 1) of the embodiment. In the simulation, polycarbonate (refractive index: 1.59) was used for the light guide plate 10, and a planar dimension of the light guide plate 10 was 22.45 mm*80 mm as illustrated in FIG. 9. Each tapered surface 10A was formed within a region of 2 mm*4 mm, and a tapered angle θt of the surface was 63.4°. Three LEDs 11 in total were disposed on each light incidence surface 10B, each LED having a thickness (height) of 0.55 mm and a width of 2.4 mm. The gap A was filled with air, and width (space) of the gap was 0.1 mm. Thickness of the light guide plate 10 was 0.6 mm, and the reflection film 12 was laminated under the light guide plate 10, and a diffusion plate and the optical film layer 13 including two sheets of BEF (brand name, manufactured by Sumitomo 3M Limited) was laminated on the light guide plate 10. A refractive index of the reflection film 12 and a refractive index of the optical film layer 13 were 1.59 each. Specter (brand name, manufactured by Integra) was used as a simulation tool, and a Monte-Carlo ray tracing method was used as a simulation method. FIG. 11A illustrates in-plane luminance distribution measured under such a condition. FIG. 11B illustrates luminance distribution along a line IV-IV of FIG. 11A. The luminance is shown with arbitrary unit (a.u.).

Figure 10:
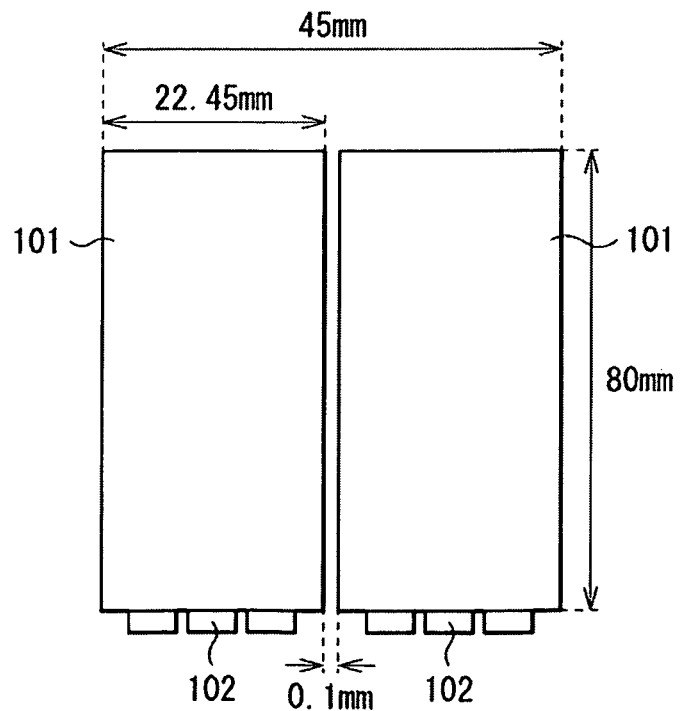
FIG. 10 is a view for illustrating a configuration of a surface light source device used in a comparative example.
Figure 12A:
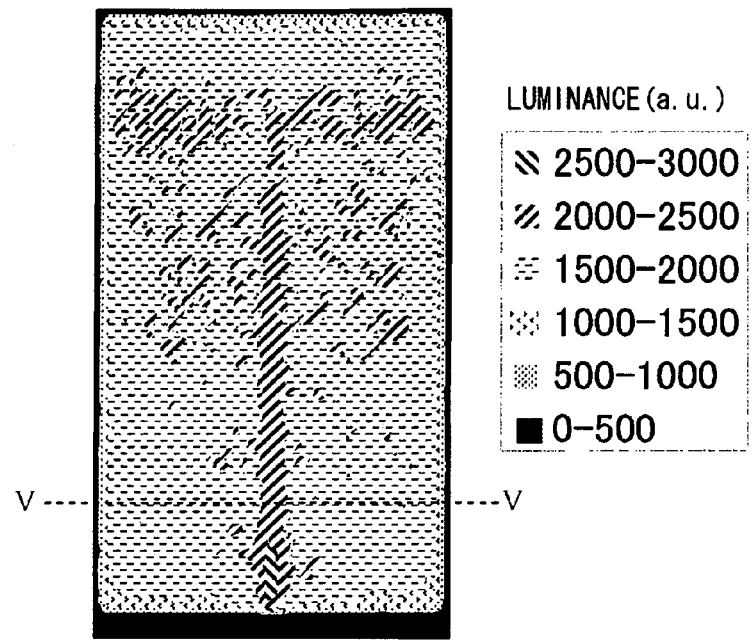
FIGS. 12A and 12B are diagrams illustrating a simulation result (luminance distribution) of the comparative example.
Figure 12B:
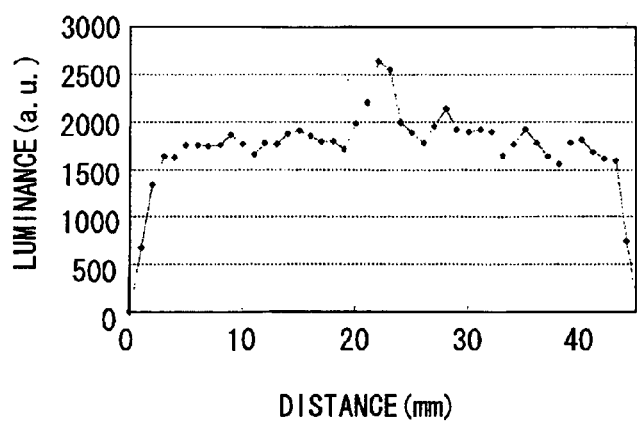

As a comparative example of the example 1, simulation of measurement of in-plane luminance distribution was performed even in the case that the tapered surfaces were not provided. The simulation was performed at the same condition as that of the example 1 except that the tapered surfaces were not provided on the light guide plate 10 having a planar dimension of 22.45 mm*80 mm as illustrated in FIG. 10. FIG. 12A illustrates in-plane luminance distribution in the comparative example. FIG. 12B illustrates luminance distribution along a line V-V of FIG. 12A. The luminance is shown with arbitrary unit (a.u.).

As illustrated in FIGS. 12A and 12B, in a configuration where a light emitting area is divided into two by the two light guide plates, clear emission lines are produced in a region near a boundary between the light guide plates and therefore luminance distribution is not uniform in the comparative example where the tapered surfaces are not provided. On the other hand, as illustrated in FIGS. 11A and 11B, occurrence of emission lines is suppressed in the example 1 where the tapered surfaces 10A are provided compared with the comparative example.

Figure 13:
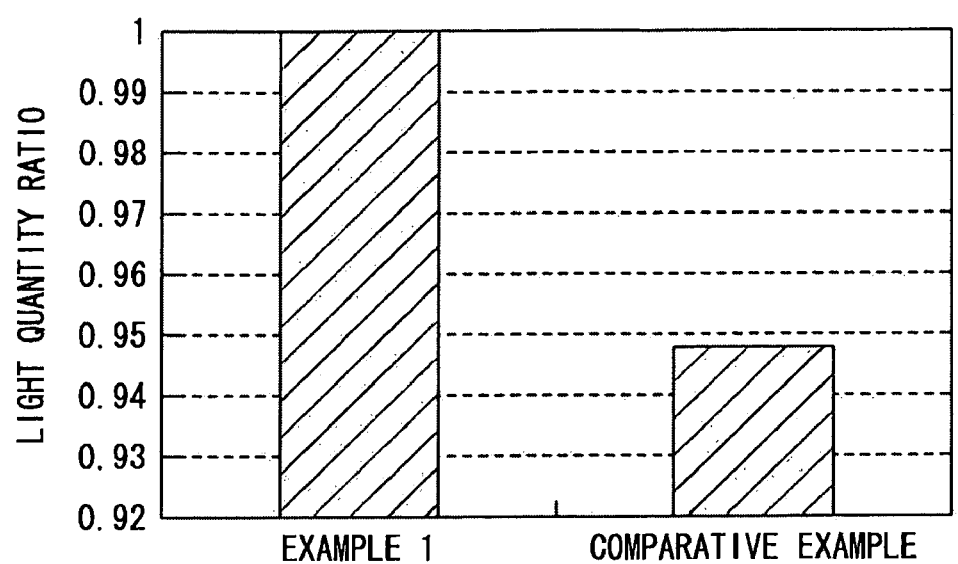
FIG. 13 is a diagram illustrating a light quantity ratio of emission light to incident light in each of the example 1 and the comparative example.

A ratio of the quantity of emitting light to the quantity of incident light (light quantity ratio) of the light guide plate was measured in the configuration of each of the example 1 and the comparative example. As a result, a result as illustrated in FIG. 13 was obtained. Specifically, use efficiency of light is high by about 5% in the example 1 with the tapered surfaces 10A compared with in the comparative example without the tapered surfaces. This is considered to be because the tapered surfaces are provided in a region near the light incidence surface, so that light leakage to the outside of the light guide plate is decreased.

Next, modifications (modifications 1 to 4) according to the embodiment of the invention will be described. Hereinafter, components similar to those in the embodiment are marked with the same reference numerals or signs, and description of them is appropriately omitted.

Modification 1

Figure 14:
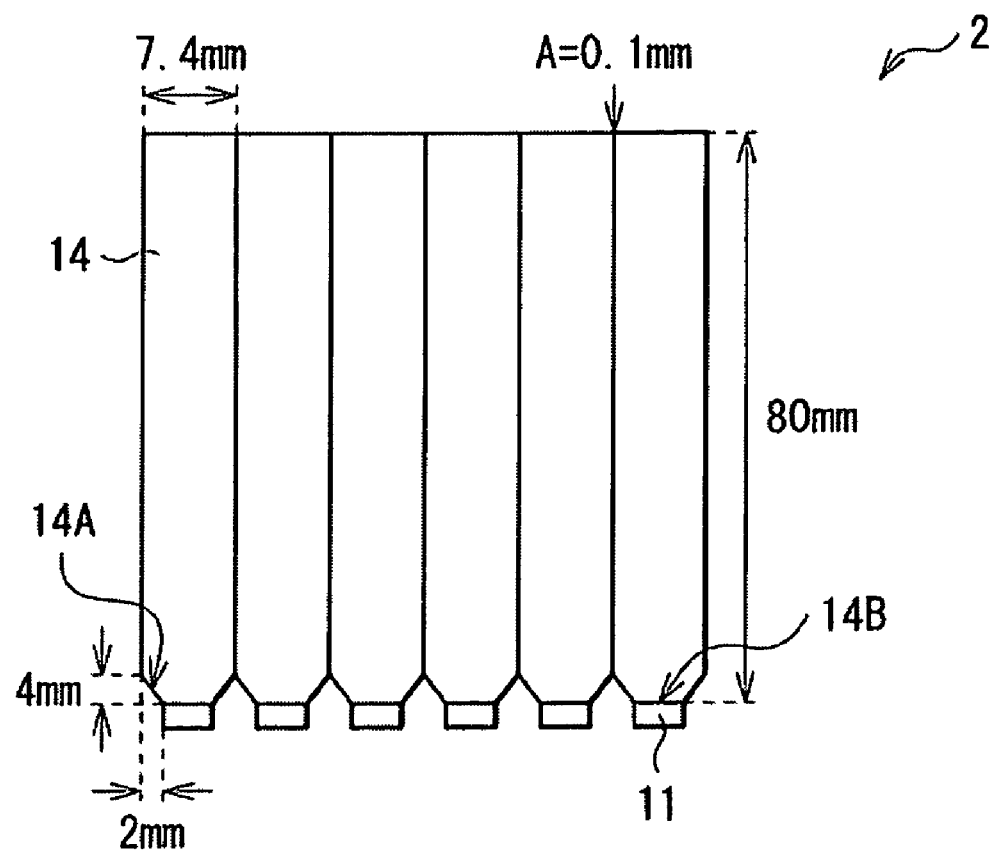
FIG. 14 is a top view illustrating a schematic configuration of a surface light source device according to modification 1.

FIG. 14 is a top view of a surface light source device 2 according to modification 1. The surface light source device 2 is used for a backlight of a liquid crystal display or the like, and particularly preferably used for a partial driving method using a plurality of light guide plates as in the surface light source device 1 of the embodiment. However, the modification 1 is configured such that a light emitting area is divided into six by six light guide plates 14 (light guide members), and the six light guide plates 14 are arranged with a gap A in between. LED 11 as a light source is provided on a light incidence surface 14B of each light guide plate 14, and tapered surfaces 14A are provided adjacently to each light incidence surface 14B. The light guide plate 14 is a plate-like optical member for transmitting light to be guided to a light emitting surface as in the light guide plate 10 in the embodiment, and includes the same material as that of the light guide plate 10.

In this way, in the modification, the six light guide plates 14 are arranged on the same plane, and the predetermined tapered surfaces 14A are provided adjacently to the light incidence surface 14B of each light guide plate 14, thereby occurrence of light leakage may be suppressed regardless of a radiation angle of incident light. This enables surface light emission using the partial driving method using the six light guide plates 14 while suppressing occurrence of emission lines. Accordingly, the same advantage as in the first embodiment may be obtained. Moreover, the number of light guide plates 14 is increased as in the modification, and thus a light emitting area is fractioned, enabling fine partial drive control.

EXAMPLE 2

Figure 15A:
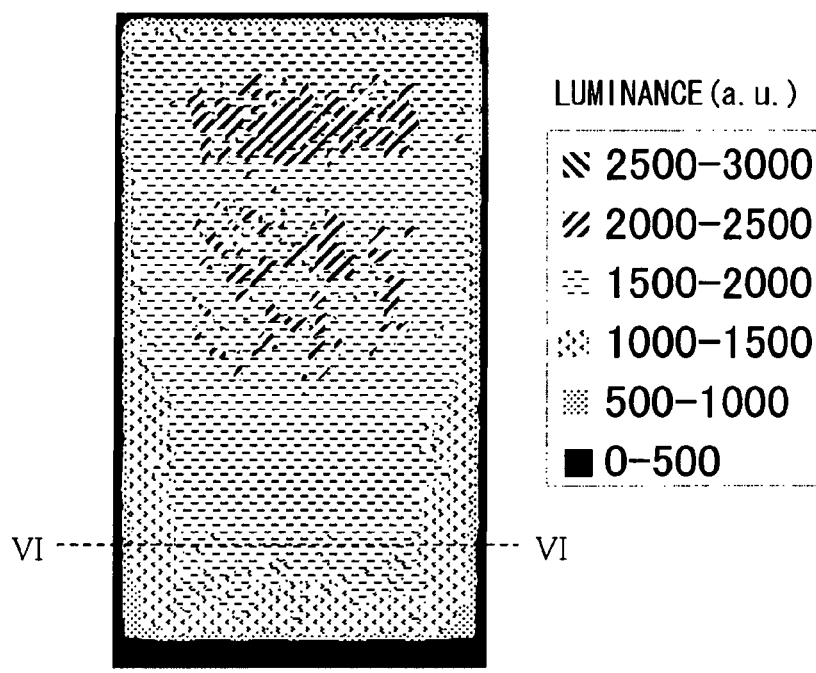
FIGS. 15A and 15B are diagrams illustrating a simulation result (luminance distribution) of example 2.
Figure 15B:
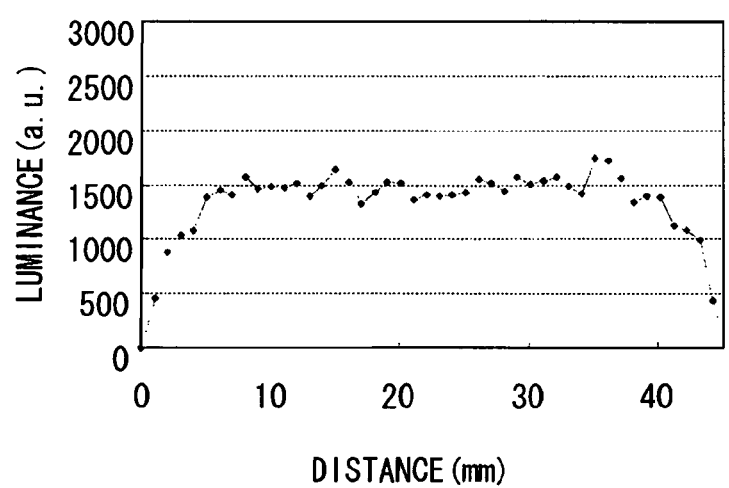

Simulation of luminance distribution measurement was performed as an example (example 2) of the surface light source device 2. In the simulation, polycarbonate (refractive index: 1.59) was used for the light guide plate 14, and a planar dimension of the light guide plate 14 was 7.4 mm*80 mm as illustrated in FIG. 14. The tapered surface 14A was formed within a region of 2 mm*4 mm, and a tapered angle θt of the surface was 63.4°. Only one LED 11 was disposed on each light incidence surface 14B, the LED having a thickness (height) of 0.55 mm and a width of 2.4 mm. Thickness of the light guide plate 14 was 0.6 mm, and other configurative conditions were the same as in the example 1. FIG. 15A illustrates in-plane luminance distribution measured in this way. FIG. 15B illustrates luminance distribution along a line VI-VI of FIG. 15A. The luminance is shown with arbitrary unit (a.u.).

As illustrated in FIGS. 15A and 15B, occurrence of emission lines is suppressed, and luminance distribution is uniform compared with the comparative example even in the configuration where the light emitting area is divided into six by the six light guide plates.

Modification 2

Figure 16:
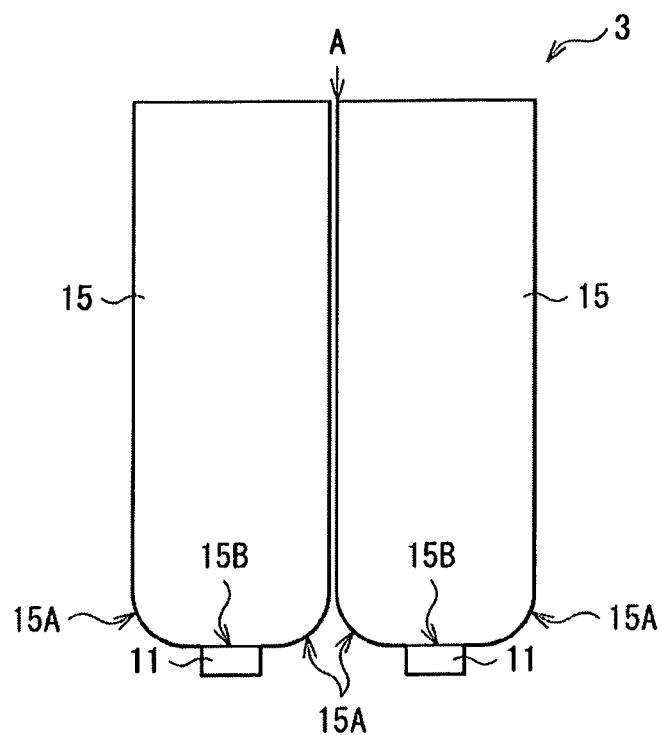
FIG. 16 is a top view illustrating a schematic configuration of a surface light source device according to modification 2.

FIG. 16 is a top view of a surface light source device 3 according to modification 2. The surface light source device 3 is used for a backlight of a liquid crystal display or the like, and particularly preferably used for a partial driving method using a plurality of light guide plates as in the surface light source device 1 of the first embodiment. In the surface light source device 3, the division number of a light emitting area is two as in the embodiment. Two light guide plates 15 are arranged on the same plane with a gap A in between, and LED 11 is provided on a light incidence surface 15B of each light guide plate 15. However, in the modification, R surfaces 15A are provided adjacently to each light incidence surface 15B. The light guide plate 15 is a plate-like optical member for transmitting light to be guided to a light emitting surface as in the light guide plate 10 in the embodiment, and includes the same material as that of the light guide plate 10.

Figure 17:
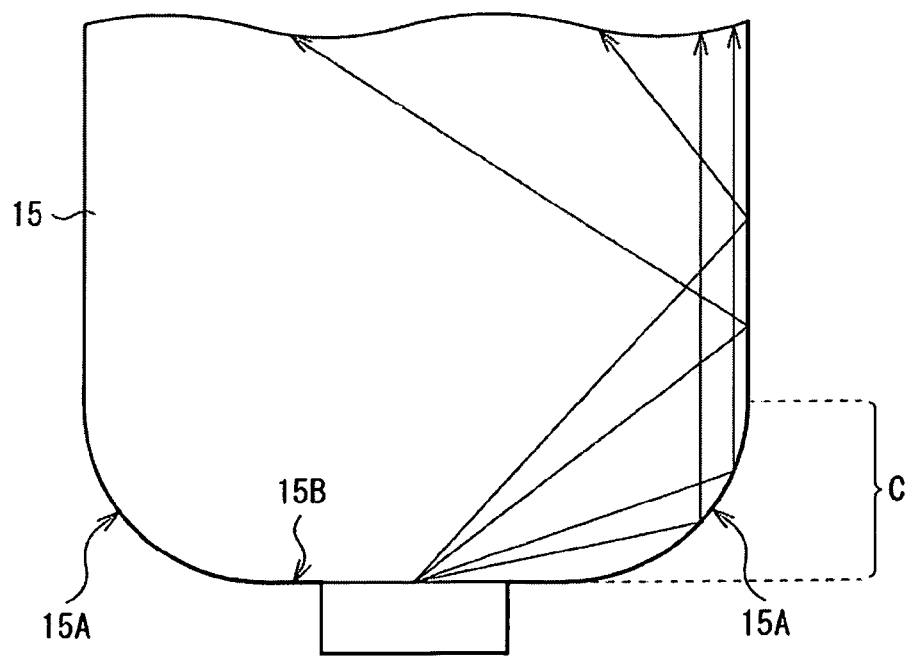
FIG. 17 is an enlarged view of a region near a light incidence surface of a light guide plate illustrated in FIG. 16.

FIG. 17 is an enlarged view of a region near a top of the light incidence surface 15B of the light guide plate 15. As in the figure, each R surface 15A is provided in a region C near the light incidence surface 15B of the light guide plate 15 adjacently to the light incidence surface 15B. The R surface 15A is a curved surface drawing an arc so as to be convex to the outside of the light guide plate 15, and curvature of the R surface 15A is desirably set in accordance with a radiation angle of light from the light incidence surface 15B. The R surface may be a spherical surface or an aspheric surface. Alternatively, the R surface may be a curved surface being convex to the inside of the light guide plate 15.

In this way, in the modification, the R surfaces 15A are provided adjacently to the light incidence surface 15B of the light guide plate 15, thereby an incident angle of light to the R surface 15A tends to be equal to or larger than the critical angle, and therefore the light tends to advance along the R surface 15A. Therefore, occurrence of light leakage may be suppressed regardless of a radiation angle of light incident from the light incidence surface 15B. This enables surface light emission using the partial driving method while suppressing occurrence of emission lines. Accordingly, the same advantage as in the embodiment may be obtained.

Modification 3

Figure 18:
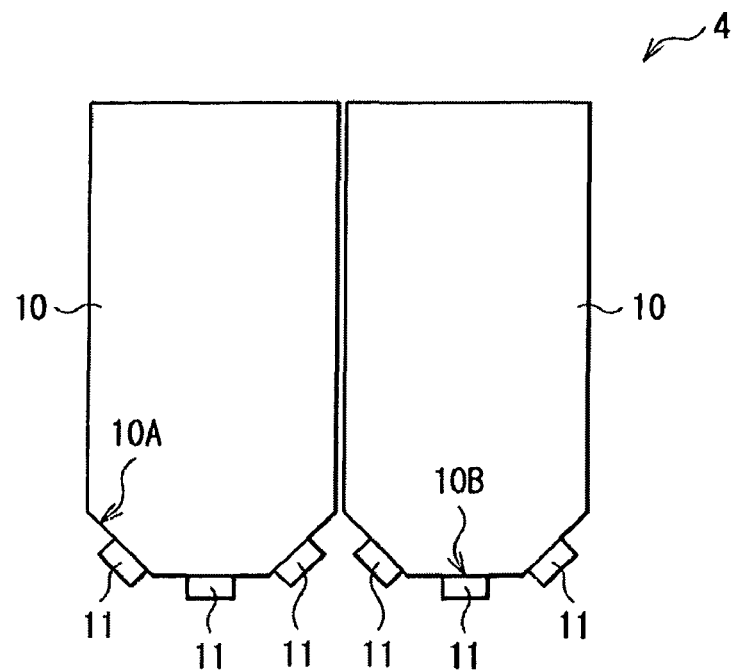
FIG. 18 is a top view illustrating a schematic configuration of a surface light source device according to modification 3.

FIG. 18 is a top view of a surface light source device 4 according to modification 3. The surface light source device 4 is used for a backlight of a liquid crystal display or the like, and particularly preferably used for a partial driving method using a plurality of light guide plates as in the surface light source device 1 of the embodiment. The surface light source device 4 has the same configuration as that of the surface light source device 1 of the embodiment except that LED 11 is provided not only on a light incidence surface 10B of a light guide plate 10, but also on each tapered surface 10A adjacent to the light incidence surface 10B.

In the modification, the tapered surfaces 10A and the light incidence surface 10B of the light guide plate 10 act as a light incidence surface each, and besides, act as a surface for facilitating incidence of light from LED 11, which is provided on another surface, at an angle equal to or larger than the critical angle. Even in such a case, light emitted from each LED 11 to the inside of the light guide plate 10 tends to be reflected in a region near the light incidence surface of the light guide plate 10 regardless of a radiation angle of the light. Accordingly, the same advantage as in the embodiment may be obtained even in the case that LED 11 is provided on each tapered surface 10A as in the modification.

Modification 4

Figure 19:
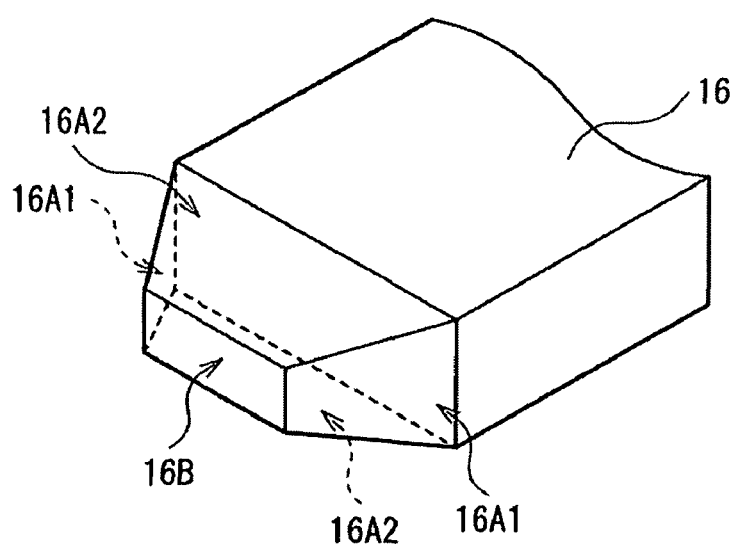
FIG. 19 is a perspective view illustrating a configuration of a light guide plate according to modification in a region near a light incidence surface of the light guide plate.

FIG. 19 is a perspective view of a portion near a light incidence surface of a light guide plate 16 of a surface light source device according to modification 4. The embodiment and the modifications 1 to 3 have been described with a case, as an example, where tapered surfaces (or R surfaces) are provided adjacently to both horizontal sides of a light incidence surface of a light guide plate. The modification 4 is configured such that tapered surfaces 16A1 are provided on both horizontal sides of a light incidence surface 16B, and besides, tapered surfaces 16A2 are provided on both vertical sides of the light incidence surface 16B. In this way, the tapered surfaces 16A1 and 16A2 may be provided adjacently to four sides of the light incidence surface 16B. The same advantage as in the embodiment may be obtained as long as the tapered surfaces 16A1 are provided on at least both horizontal sides of the light incidence surface 16B.

Application Example

The surface light source devices according to the embodiment and the modifications 1 to 4 (surface light source devices 1 to 4) are preferably used for, for example, the following display device 5.

Figure 20:
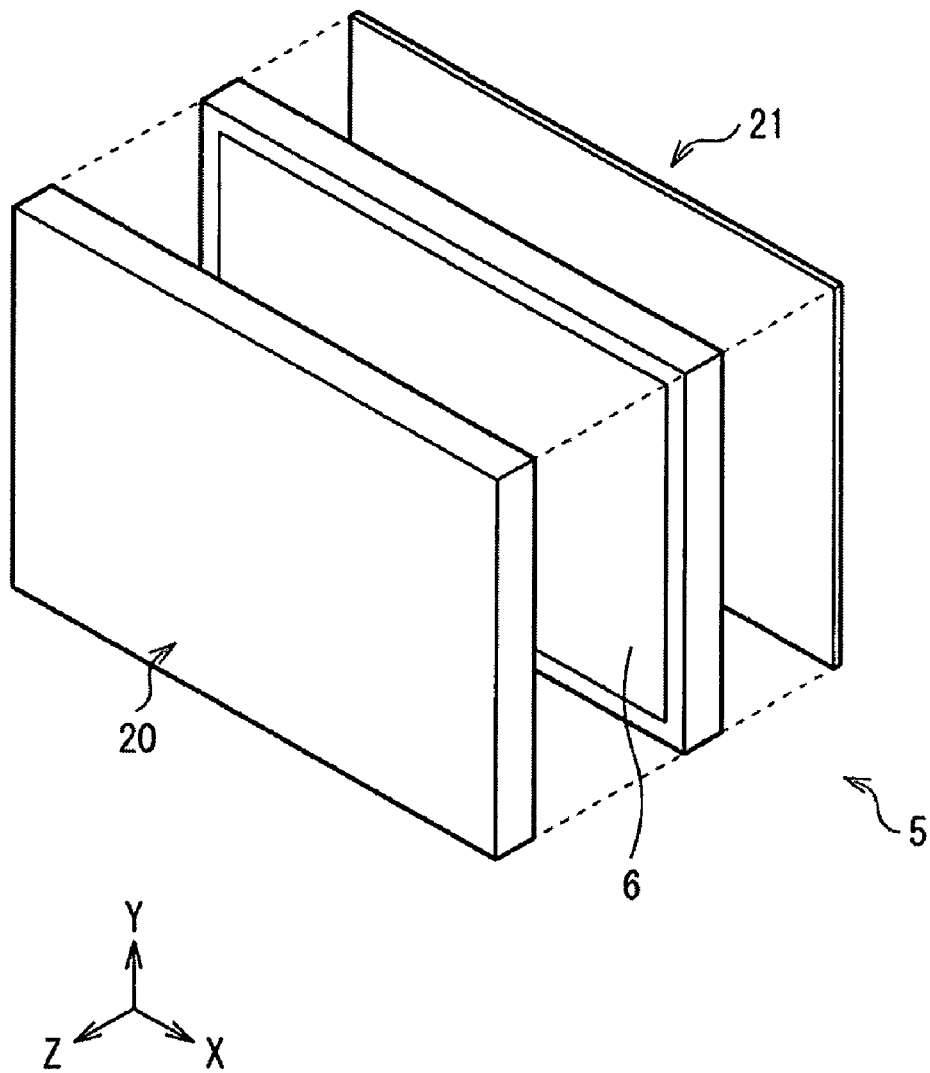
FIG. 20 is a schematic view sowing a main-part configuration of a display device of application 1.

FIG. 20 illustrates a main-part configuration of the display device 5. The display device 5 is, for example, a liquid crystal display, and includes a backlight 6, a display panel 20 and a circuit section 21 (including a light source drive section). Any of the surface light source devices 1 to may be used for the backlight 6. The display panel 20 modulates illumination light from the backlight 6 according to an image signal, and thus performs image display. For example, a liquid crystal panel is used for the display panel 20. The circuit section 21 performs drive control of each of the backlight 6 and the display panel 20. While the circuit section 21 may be provided behind the backlight 6 as in the application, the circuit section 21 may be formed on a pad electrode or on a flexible printed circuit (FPC) in small display use for mobile devices or the like.

Figure 21:
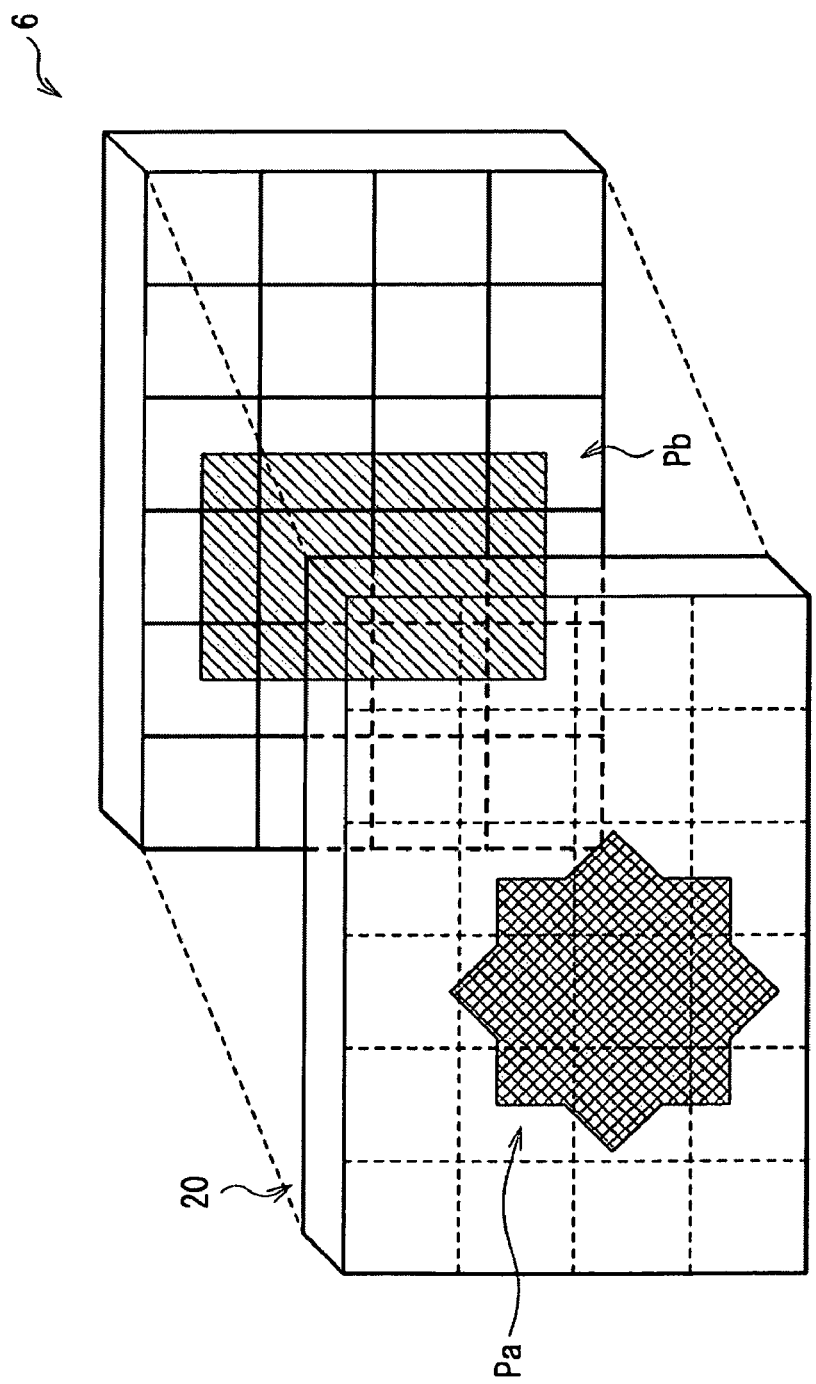
FIG. 21 is a schematic view for illustrating partial drive operation of the display device illustrated in FIG. 20.

In the display device 5, the backlight 6 may be controllably driven to be turned on or off for each of regions divided by the plurality of light guide plates (partial drive control). For example, as illustrated in FIG. 21, the backlight may be controllably driven such that only light guide plates in an area Pb are turned on, the area Pb being corresponding to an image display area with luminance equal to or higher than predetermined luminance (a display area of an image Pa) in an effective display area of the display panel 20. The surface light source device as above is used as the backlight 6, thereby occurrence of emission lines is suppressed in a region near a boundary between light guide plates, leading to natural appearance of a display image. Accordingly, image quality may be improved.

While the invention has been described with the embodiment and the modifications, and the application example of them hereinbefore, the invention is not limited to the embodiment and the like, and may be variously modified or altered. For example, while the embodiment and the like have been described with a configuration, as an example, where two or six light guide plates are arranged on the same plane, the number of light guide plates is not limited to this, and may be three, four, five, or seven or more.

In addition, while the embodiment and the like have been described with a case, as an example, where a planar shape of the light guide plate is a rectangular shape, the shape is not limited to the rectangular shape, and may be a square shape.

Furthermore, while the embodiment and the like have been described with a configuration, as an example, where a plurality of light guide plates are arranged only in one direction, a layout of the light guide plates is not limited to this. For example, the plurality of light guide plates may be arranged in a matrix pattern as long as the light guide plates are arranged on the same plane.

In addition, while the embodiment and the like have been described with a case, as an example, where one side face of each light guide plate is formed to be a light incidence surface, and LED is provided on the light incidence surface, LED may be further provided on another surface. Specifically, for example, LED may be provided on each of two surfaces opposed to each other of a light guide plate. However, in this case, tapered surfaces (or R surfaces) are provided adjacently to each of the two surfaces having LED provided thereon.

It should be understood by those skilled in the art that various modifications, combinations, sub-combinations and alterations may occur depending on design requirements and other factors insofar as they are within the scope of the appended claims or the equivalent thereof.

What is claimed is:

1. A surface light source device comprising:
light sources; and
a plurality of light guide members, each light guide member having a light incidence surface for light entering from each of the light sources, and making surface light emission based on incident light from the light incidence surface,
wherein the plurality of light guide members are arranged on the same plane, and
wherein each light guide member has tapered surfaces adjacent to the respective light incidence surface, and each tapered surface having a predetermined angle against the respective light incidence surface in which the following conditional expression is satisfied:

$$\theta t \leq 180-(\theta max+\theta c)$$

where
$\theta t$ is an angle of the light incidence surface against each tapered surface,
$\theta max$ is a maximum value of a radiation angle (half-value angle) of light entering from the light incidence surface, and
$\theta c$ is a critical angle when light enters from the light guide member to a gap between adjacent light guide members.

2. The surface light source device according to claim 1, wherein the gap between any two light guide members adjacent to each other of the plurality of light guide members is filled with air or a material having a low refractive index.

3. The surface light source device according to claim 1, wherein the surface light source device has a light source drive section independently driving the light sources to be turned on or off for each light source.

4. A display device comprising:
a surface light source device; and
a display panel modulating light from the surface light source device according to an image signal, and thus performing image display,
wherein the surface light source device includes
light sources, and
a plurality of light guide members, each light guide member having a light incidence surface for light entering from each of the light sources, and making surface light emission based on incident light from the light incidence surface,
wherein the plurality of light guide members are arranged on the same plane, and
wherein each light guide member has tapered surfaces adjacent to the respective light incidence surface, and each tapered surface having a predetermined angle against the respective light incidence surface in which the following conditional expression is satisfied:

$$\theta t \leq 180-(\theta max+\theta c)$$

where
$\theta t$ is an angle of the light incidence surface against each tapered surface,
$\theta max$ is a maximum value of a radiation angle (half-value angle) of light entering from the light incidence surface, and
$\theta c$ is a critical angle when light enters from the light guide member to a gap between adjacent light guide members.

5. The display device according to claim 4,
wherein the display device has a light source drive section driving the light sources of the surface light source device such that the light sources are switched to be on or off for each light source in accordance with an image to be displayed.

6. A surface light source device comprising:
a plurality of light sources; and
a plurality of light guide members, each light guide member having at least one light incidence surface whereat one of the light sources is provided to enable surface light emission to be performed based on incident light from the respective light incidence surface,
the plurality of light guide members being arranged on the same plane, and
each said light guide member having tapered surfaces adjacent to the respective at least one light incidence surface, and each tapered surface having a predetermined angle $\theta t$ against the respective light incidence surface which satisfies the following:

$$\theta t \leq 180-(\theta max+\theta c)$$

where
$\theta t$ is an angle of the respective light incidence surface against each respective tapered surface,
$\theta max$ is a maximum value of a radiation angle (half-value angle) of light entering from the respective light incidence surface, and
$\theta c$ is a critical angle when light enters from the respective light guide member to a gap between adjacent light guide members.

7. The surface light source device according to claim 6, in which in addition to the light source provided on the at least one light incidence surface of a respective one of the light guide members, another light source is provided on at least one of the tapered surfaces of the respective one of the light guide members.

* * * * *